United States Patent
Hoshino et al.

(10) Patent No.: US 8,421,987 B2
(45) Date of Patent: Apr. 16, 2013

(54) DISCRIMINATION MEDIUM AND PRODUCTION METHOD THEREFOR

(75) Inventors: Hidekazu Hoshino, Yokohama (JP); Tokio Sakauchi, Yokohama (JP); Mutsumi Sasaki, Yokohama (JP); Tohru Ida, Yokohama (JP); Naomi Iida, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 124 days.

(21) Appl. No.: 12/863,460

(22) PCT Filed: Nov. 14, 2008

(86) PCT No.: PCT/JP2008/070790
§ 371 (c)(1), (2), (4) Date: Aug. 12, 2010

(87) PCT Pub. No.: WO2009/093372
PCT Pub. Date: Jul. 30, 2009

(65) Prior Publication Data
US 2010/0302486 A1 Dec. 2, 2010

(30) Foreign Application Priority Data
Jan. 22, 2008 (JP) .................. 2008-011832

(51) Int. Cl.
*G09F 3/03* (2006.01)
*B44F 1/12* (2006.01)

(52) U.S. Cl.
USPC ............. 349/176; 349/175; 349/193; 283/91

(58) Field of Classification Search .................. None
See application file for complete search history.

(56) References Cited

U.S. PATENT DOCUMENTS

| | | | |
|---|---|---|---|
| 7,316,422 B1 * | 1/2008 | Schmitz | 283/91 |
| 2002/0051264 A1 * | 5/2002 | Shiozawa et al. | 359/2 |
| 2007/0037290 A1 * | 2/2007 | Hoshino et al. | 436/170 |
| 2007/0241553 A1 * | 10/2007 | Heim et al. | 283/91 |
| 2008/0090029 A1 * | 4/2008 | Hoshino et al. | 428/29 |
| 2008/0138543 A1 * | 6/2008 | Hoshino et al. | 428/29 |
| 2009/0115185 A1 * | 5/2009 | Hoffmuller et al. | 283/85 |

FOREIGN PATENT DOCUMENTS

EP  1 798 026 A1  6/2007

(Continued)

OTHER PUBLICATIONS

Aug. 24, 2011 Office Action issued in Japanese Application No. 2008-011832 (with partial translation).

(Continued)

*Primary Examiner* — Mike Stahl
(74) *Attorney, Agent, or Firm* — Oliff & Berridge, PLC

(57) ABSTRACT

A discrimination medium, which can have much information, can be produced on a small scale at low cost, and enables change of a sticker design at low cost, is provided. A cholesteric liquid crystal layer, having a fine asperity for forming a hologram, is formed on a transparent first substrate. A print layer composed of a black ink is formed on a transparent second substrate. The substrates are affixed to each other via a bond layer, so that a discrimination medium is obtained. In the discrimination medium, the display content obtained by the print layer is changed, so that the display content for discrimination can be changed at low cost.

1 Claim, 5 Drawing Sheets

FOREIGN PATENT DOCUMENTS

| | | |
|---|---|---|
| EP | 1 833 034 A1 | 9/2007 |
| JP | A-11-42875 | 2/1999 |
| JP | A-2006-153990 | 6/2006 |
| JP | A-2007-044993 | 2/2007 |
| JP | A-2007-279129 | 10/2007 |
| JP | A-2008-093920 | 4/2008 |
| JP | 2008-137232 A * | 6/2008 |
| WO | WO 2006/068180 A1 | 6/2006 |

OTHER PUBLICATIONS

International Search Report for International Application No. PCT/JP2008/070790, mailed on Jan. 6, 2009 (w/ English translation).
Supplementary European Search Report, dated Nov. 7, 2012, from European Patent Application No. EP 08 87 1585.9.

* cited by examiner right-handed circularly polarized light having predetermined wavelength random light (natural light)

left-handed circularly polarized light, right-handed circularly polarized light having wavelength other than predetermined wavelength, linearly polarized light

DISCRIMINATION MEDIUM AND PRODUCTION METHOD THEREFOR

TECHNICAL FIELD

The present invention relates to a discrimination medium for determining whether or not various products are authentic. In particular, the present invention relates to a discrimination medium which can have much information, can be redesigned at low cost, and is suitable for small scale production. The present invention relates to a production method for the discrimination medium.

BACKGROUND ART

In order to prevent counterfeiting of passports, various cards, certificates, various products, and the like, techniques of coating a special ink on a surface of an article have been known, and techniques of applying a hologram on a surface of an article have been known. For example, Japanese Unexamined Patent Application Publication No. Hei 11-042875 has disclosed an anticounterfeiting technique using a cholesteric liquid crystal with a hologram. In this technique, a cholesteric liquid crystal and a hologram are combined, and a reflection light therefrom is observed via a left circular polarization filter and a right circular polarization filter, so that the authenticity can be determined. Specifically, when the hologram can be observed via the right circular polarization filter, the hologram cannot be observed via the left circular polarization filter. The authenticity of the article can be determined by using this phenomenon.

However, in the above technique, since only the hologram can have information (logo, production lot, and the like), the information amount may be a little. Since a block used for hologram production is expensive, the technique may not be suitable for small-scale production, and change of figure may require high cost.

DISCLOSURE OF THE INVENTION

An object of the present invention is to provide a discrimination medium which can have much information, can be produced on a small scale at low cost, and can be redesigned at low cost. Another object of the present invention is to provide a production method therefor.

According to one aspect of the present invention, a discrimination medium includes: a cholesteric liquid crystal layer which has a fine asperity used for displaying a hologram; and a print layer which has a predetermined pattern reflecting or absorbing a light of a predetermined wavelength, wherein the cholesteric liquid crystal layer and the print layer are disposed in turn from a side checked visually.

In the above aspect of the present invention, various information can be displayed by combination of displays of the hologram and the print pattern of the print layer. The display content used for discrimination can be changed at low cost by changing the print pattern of the print layer which can be produced at low cost. In the one aspect of the present invention, another layer may be provided between the cholesteric liquid crystal layer and the print layer. The cholesteric liquid crystal layer and the print layer may contact each other. The contents of displays of the hologram and the print pattern of the print layer can include characters, designed characters, figures, patterns, or combination of at least two selected from them.

According to a desirable embodiment of the present invention, the discrimination medium further may include: a first substrate which is optically transparent and on which the cholesteric liquid crystal layer is formed; and a second substrate which is optically transparent and on which the print layer is formed, wherein the first substrate and the second substrate are affixed to each other. The optical transparency of material may be a property in which the material allows visible light to pass therethrough. It may be desirable that visible light transmittance ratio be higher, and an optical loss, which is within a range which does not affect discrimination using the discrimination medium, may be generated.

In the above embodiment of the present invention, the display content for discrimination can be changed by changing the pattern of the print layer of the second substrate side. The change of the pattern of the print layer can be performed at low cost, so that the cost for the change of the display content can be reduced.

According to a desirable embodiment of the present invention, the print layer may be provided on a surface of the cholesteric liquid crystal layer on which the fine asperity is formed. In this embodiment of the present invention, the print layer, which is formed on the cholesteric liquid crystal layer, is changed without changing of the cholesteric liquid crystal layer, so that the display content for discrimination can be changed. The change of the print layer can be performed at low cost, so that the cost for acquisition of different display content can be reduced.

According to another aspect of the present invention, a production method for a discrimination medium includes steps of: forming a cholesteric liquid crystal layer on a first substrate which is optically transparent; forming a fine asperity on a surface of the cholesteric liquid crystal layer, the fine asperity used for displaying a hologram; forming a print layer on a second substrate which is optically transparent, the print layer having a predetermined pattern reflecting or absorbing a light of a predetermined wavelength; and affixing the first substrate and the second substrate to each other.

In the above aspect of the present invention, display content of the discrimination medium can be changed by changing the second substrate side. The change of the pattern of the print layer can be performed at low cost, so that the cost for the change of the second substrate side can be reduced. Thus, plural variations are prepared for the second substrate side, so that the discrimination medium, which can display various contents, can be produced without increasing cost. The predetermined wavelength may be a specific wavelength of 700 nm or a band of wavelength having a width (for example, a band of wavelength of overall range of visible light.

According to another aspect of the present invention, a production method for a discrimination medium includes steps of: forming a cholesteric liquid crystal layer on a first substrate which is optically transparent; forming a fine asperity on a surface of the cholesteric liquid crystal layer, the fine asperity used for displaying a hologram; and forming a print layer on the surface of the cholesteric liquid crystal layer on which the fine asperity is formed, the print layer having a predetermined pattern reflecting or absorbing a light of a predetermined wavelength. In this aspect of the present invention, display content for discrimination can be changed by only changing the process for forming the print layer.

According to the present invention, a discrimination medium, which can have much information, can be produced on a small scale at low cost, and can be redesigned at low cost, can be provided, and a production method for the discrimination medium can provided.

Figure 1:
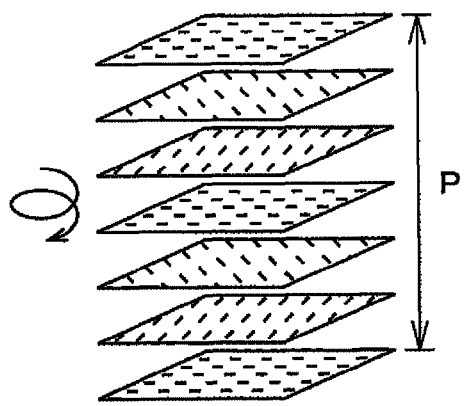
FIG. 1 is a conceptual diagram for explaining a structure of cholesteric liquid crystal.

EXPLANATION OF REFERENCE NUMERALS 301 denotes a transparent first substrate, 302 denotes a cholesteric liquid crystal layer, 303 denotes a fine asperity processed portion for hologram display, 304 denotes a transparent second substrate, 305 denotes a print layer, 306 denotes an adhesive layer, 307 denotes a release sheet, 308 denotes a transparent bond layer, 310 denotes a discrimination medium, 31 denotes a first substrate side member, and 32 denotes a second substrate side member.

BEST MODE FOR CARRYING OUT THE INVENTION

1. First Embodiment

Regarding Cholesteric Liquid Crystal

Figure 2:
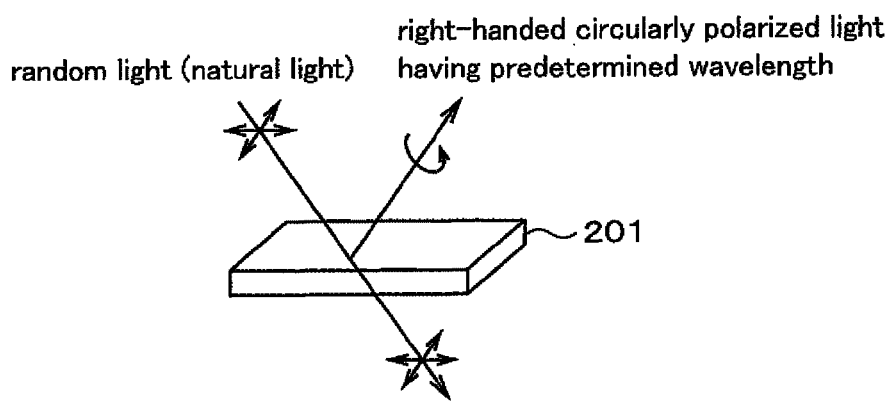
FIG. 2 is a conceptual diagram for explaining optical characteristics of cholesteric liquid crystal.

First, cholesteric liquid crystal will be simply explained. FIG. 1 is a conceptual diagram for explaining a structure of cholesteric liquid crystal. FIG. 2 is a conceptual diagram for explaining optical characteristics of cholesteric liquid crystal. As shown in FIG. 2, when natural light enters to a cholesteric liquid crystal layer 201, a right-handed circularly polarized light having a predetermined wavelength is reflected by the cholesteric liquid crystal layer 201. A left-handed circularly polarized light, a linearly polarized light, and a right-handed circularly polarized light having another predetermined wavelength pass through the cholesteric liquid crystal layer 201.

The cholesteric liquid crystal layer has a stacked structure. In one layer, long axes of liquid crystal molecules have the same orientation and are parallel to the plane thereof in a surface of a layer. Layers of the stacked structure, which are adjacent to each other, are slightly different from each other in a direction of the orientation, and the layers are stacked with the orientations rotating in a three-dimensional spiral structure overall.

In this structure, in a direction perpendicular to the layer, pitch P is a distance necessary for the molecular long axis to be rotated through 360° and return to the initial state, and an average refraction index of the each layer is index n. In this case, the cholesteric liquid crystal layer selectively reflects circularly polarized light having a center wavelength $\lambda s$ satisfying the equation $\lambda s = n \times P$. That is, when white light enters to the cholesteric liquid crystal layer, a right-handed or left-handed circularly polarized light having a predetermined center wavelength is selectively reflected. In this case, circularly polarized light, which has the same circling direction as the reflected circularly polarized light but does not have the wavelength of $\lambda s$, passes through the cholesteric liquid crystal layer, a circularly polarized light, which has a circling direction reverse to the reflected circularly polarized light, passes through the cholesteric liquid crystal layer, and a linearly polarized light passes through the cholesteric liquid crystal layer.

The circling direction (rotating direction) of the reflected circularly polarized light is determined by selecting a spiral direction of the cholesteric liquid crystal layer. That is, when the long axes are seen from the incident direction of the light, by selecting either the spiral direction in which the molecular long axis of each layer orientation is clockwise or counterclockwise, the circling direction (rotating direction) of the reflected circularly polarized light can be determined.

The cholesteric liquid crystal layer exhibits color shift phenomenon. The principle of the color shift will be explained hereinafter. When a light obliquely enters to a multilayer film having a multilayer structure, the light reflects at each interface of the multilayer structure. In this case, the layers, which are adjacent to each other and are optically transparent, have refraction indexes different from each other. These reflections are caused by the difference of the refractive indexes of the transparent films adjacent to each other. When one interface is viewed, the incident light is partially reflected and most of it is transmitted. That is, the light entering to the interfaces of the laminated films is reflected at each interface little by little. The light is basically reflected in the same direction at each interface, so that interference occurs depending on optical path differences.

When the incident light enters to the films from a direction approximately parallel to the surface, the optical path difference is small, and the light of shorter wavelengths interferes and is reinforced. In this way, when the viewing angle is increased, the reflected light of the shorter wavelengths interferes and is reinforced. As a result, when the multilayer film is viewed under white light, it appears to have a predetermined color at a viewing angle of 0 degree. In contrast, as the viewing angle is increased, the multilayer film gradually changes color to a bluish state. The phenomenon observed in this manner is called the color shift phenomenon. The viewing angle is an angle between a line of vision and a line perpendicular to the layer.

Production Method for Discrimination Medium and Structure of Discrimination Medium First, one example of production processes for discrimination medium using one embodiment of the present invention will be explained. FIGS. 3A to 3E are cross sectional views showing one example of production processes for discrimination medium using one embodiment of the present invention. First, a first substrate 301, which is optically transparent and functions as a surface protection layer, is prepared (in FIG. 3A). In this case, the transparent first substrate 301 may be film-like one which is composed of TAC (triacetyl cellulose) and has a thickness of 40 µm. The first substrate 301 has an isotropic refraction index in order to maintain the circular polarization condition of the light passing through the first substrate 301. For example, a polycarbonate and a polystyrene can be used as a material of the first substrate 301 which satisfies the above condition.

Figure 3A:
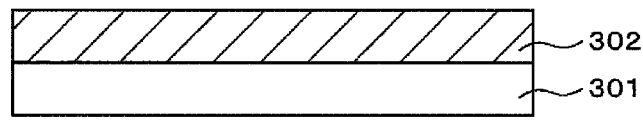
FIGS. 3A to 3E are diagrams showing one example of production processes for discrimination medium using one embodiment of the present invention.

After the first substrate 301 is prepared, for example, a cholesteric liquid crystal layer 302 having a thickness of 2 µm is formed on the first substrate 301. Thus, the condition shown in FIG. 3A is obtained. A layer, which exhibits optically selective reflection property and circular polarization selectivity, can be used as the cholesteric liquid crystal layer 302. In particular, a polymer film of which cholesteric liquid crystal orientation is fixed is desirably used. A film, in which cholesteric liquid crystal grains are dispersed in supports, or the like may be used.

One example of the polymer film, of which cholesteric liquid crystal orientation is fixed, is produced as follows. For example, a low molecular liquid crystal is oriented in a cholesteric orientation. Then, the low molecular liquid crystals are joined by photoreaction, thermal reaction, or the like, and the molecular orientation is fixed. As a result, a polymer film, of which cholesteric liquid crystal orientation is fixed, can be produced. Alternatively, a thermotropic polymer liquid crystal of the branched-chain type or the straight-chain type may be oriented in a cholesteric orientation in a liquid crystal condition. Then, the cholesteric liquid crystal orientation thereof is fixed by cooling to a temperature of the liquid crystal transition point or lower. As a result, a polymer film, of which cholesteric liquid crystal orientation is fixed, can be produced. Alternatively, a lyotropic polymer liquid crystal of the branched-chain type or the straight-chain type may be oriented in a cholesteric orientation in a solvent, and the molecular orientation thereof is fixed by gradually removing the solvent. As a result, a polymer film, of which cholesteric liquid crystal orientation is fixed, can be produced.

As a polymer liquid crystal for production of the above polymer films, a branched-chain type polymer having a liquid crystal forming group in a branched-chain, such as a polyacrylate, a polymethacrylate, a polysiloxane, and a polymalonate may be used. Alternatively, a straight-chain type polymer having a liquid crystal forming group in a straight chain, such as a polyester, a polyester amide, a polycarbonate, a polyamide, and a polyimide may be used.

Figure 3B:
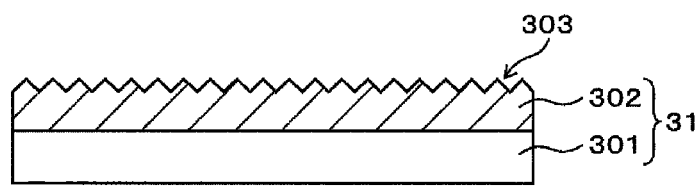

After the condition shown in FIG. 3A is obtained, the cholesteric liquid crystal layer 302 is pressed on a block (mold), which is used for forming a hologram, on the cholesteric liquid crystal layer 302, so that a fine asperity (emboss) 303, which has recesses and projections and forms an hologram image, is formed (in FIG. 3B). Thus, a first substrate side member 31 is obtained. As shown in FIG. 3B, the first substrate side member 31 has a stacked structure having the first substrate 301 and the cholesteric liquid crystal layer 302 provided on a surface thereof. In this case, the first substrate 301 is used as a base member, and the cholesteric liquid crystal layer 302 has the fine asperity which forms the hologram image.

Figure 3C:
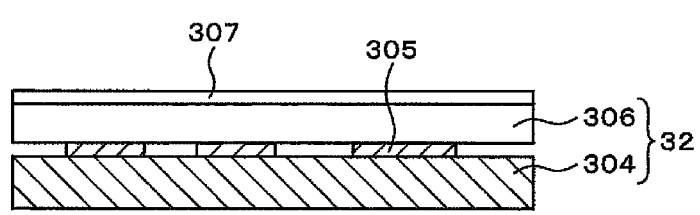

A member shown in FIG. 3C, which is different from the above first substrate side member 31, is produced. This member is a second substrate side member 32 has a second substrate 304, a print layer 305, and an adhesive layer 306. The second substrate 304 is a plastic substrate which is optically transparent. For example, the second substrate 304 is a substrate which is composed of PET (polyethylene terephthalate) and has a thickness of 15 μm. The print layer 305 has a pattern which forms a predetermined figure printed on a surface of the second substrate 304. The print layer 305 is provided by printing a black ink on the surface of the second substrate 304. The adhesive layer 306 covers the print layer 305. The adhesive layer 306 is used for affixing a discrimination medium onto an article which is discriminated by the discrimination medium. The adhesive layer 306 is composed of a resin type adhesive having stable adhesion. The adhesive layer 306 may has light permeability, light absorptivity, or light reflectivity. When the adhesive layer 306 may has light reflectivity or light absorptivity, it is necessary that the adhesive layer 306 exhibit a color different from the print layer 305 and have an appearance different from the print layer 305. In the example shown in FIG. 3C, release sheet 307 is affixed to a surface on which the adhesive layer 306 is exposed.

As described above, the first substrate side member 31 shown in FIG. 3B and the second substrate side member 32 shown in FIG. 3C are obtained. Next, the surface and the reverse surface of the second substrate side member 32 are reversed, and a second substrate side member 32' is set (in FIG. 3D). A bond or an adhesive, which is optically transparent, is coated on the surface adjacent to the second substrate 304, so that a transparent bond layer 308 is formed. The bond or the adhesive of the bond layer 308 may be transparent resin type one which is commercially available. Regarding the bond, the material of the bond may be cured and may thereby exert a bonding force. Regarding the adhesive, the adhesion force of the adhesive may not be lost and be maintained.

Figure 3D:
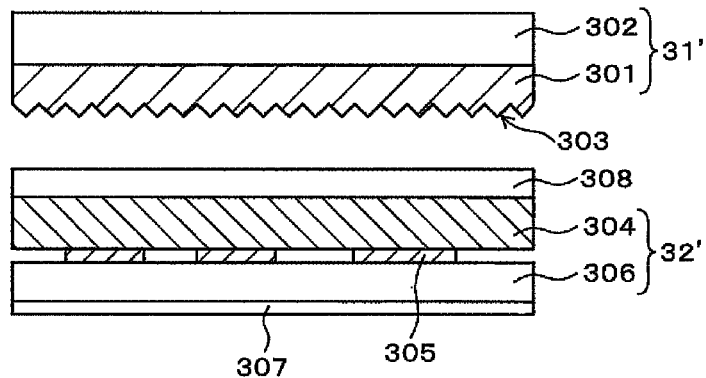

On the other hand, the surface and the reverse surface of the first substrate side member 31 are reversed, and a first substrate side member 31' is set (in FIG. 3D). The surface of the fine asperity 303 for hologram display of the cholesteric liquid crystal layer 302 is faced to the bond layer 308 of the second substrate side member 32'. Thus, the condition shown in FIG. 3D is obtained. Next, the bond layer 308 is contacted on the cholesteric liquid crystal layer 302, and the first substrate 301 and the second substrate 304 are bonded to each other. As a result, a discrimination medium 310 shown in FIG. 3E is obtained.

Figure 3E:
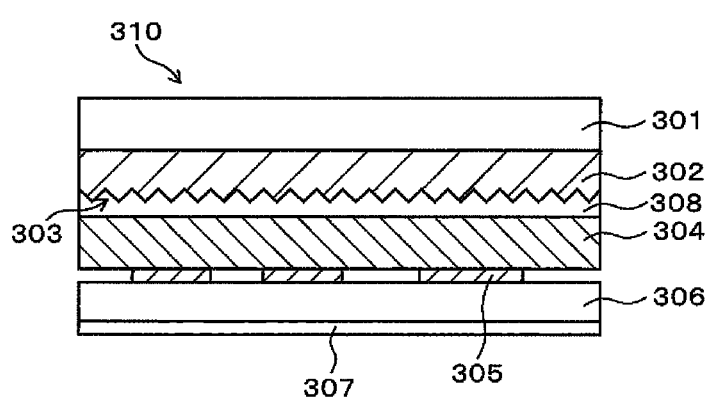

The discrimination medium 310 shown in FIG. 3E has a stacked structure such that the transparent first substrate 301, the cholesteric liquid crystal layer 302, the transparent bond layer 308, the transparent second substrate 304, the black print layer 305, the adhesive layer 306 are stacked in turn from a side checked visually in observing the discrimination medium 310. The first substrate 301 functions as a protection layer. The cholesteric liquid crystal layer 302 has the hologram formed on the surface thereof. The print layer 305 has the predetermined pattern. In order to secure the discrimination medium 310 onto an article, the release sheet 307 is peeled, the adhesive layer 306 is contacted on a surface of the article, and the discrimination medium 310 is affixed to the article by the adhesion force of the adhesive layer 306. In FIG. 3E, from a side checked visually in observing the discrimination medium 310, the second substrate 304 and the print layer 305 are disposed in turn. Alternatively, the print layer 305 and the second substrate 304 may be disposed in turn.

Example 1 of Discrimination Function of Embodiment

Figure 4A:
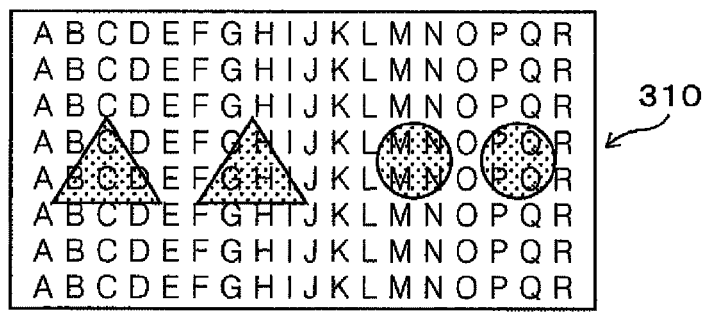
FIGS. 4A to 4C are diagrams showing one example of a discrimination function of a discrimination medium using one embodiment of the present invention.
Figure 4B:
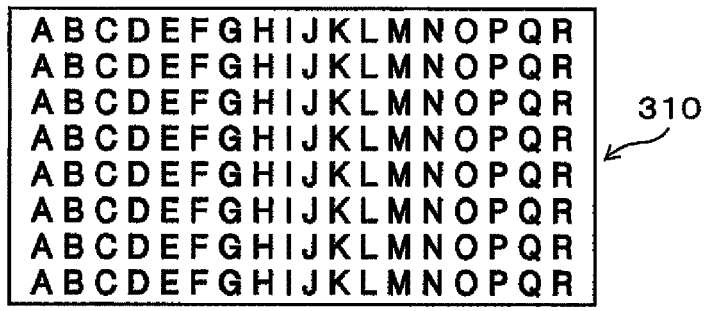
Figure 4C:
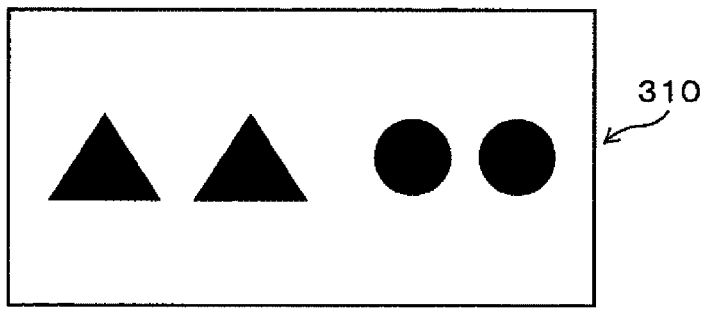

FIGS. 4A to 4C are conceptual diagrams showing an outline of a discrimination function of the discrimination medium 310 shown in FIG. 3E. In this example, the cholesteric liquid crystal layer 302 shown in FIG. 3E is set to selectively reflect a right-handed circularly polarized green light. Characters "ABCDEFG . . . " are displayed as a hologram display by the fine asperity 303 used for hologram display. Patterns of "▲" and "●" are displayed by a print pattern of the black print layer 305. In the example shown in FIGS. 4A to 4C, the adhesive layer 306 shown in FIG. 3E is transparent, and a surface of the article on which discrimination medium 310 is affixed, is whitish.

FIG. 4A shows a condition in which the discrimination medium 310 is observed from a side of the first substrate 301 by a direct visual check. In this case, a reflection light from the cholesteric liquid crystal layer 302 is visually confirmed, and a reflection light from the layers under the cholesteric liquid crystal layer 302 is visually confirmed. That is, since the reflection light from the cholesteric liquid crystal layer 302 can be observed, the hologram display (the characters "ABCDEFG . . . "), which are formed on the cholesteric liquid crystal layer 302, can be observed. A portion of components of light, which passed through the cholesteric liquid crystal layer 302, is absorbed by the black print layer 305. Another component of the light passes through the transparent adhesive layer 306, and is reflected by the whitish surface of the article, and it exits through the opposite passage from the discrimination medium 310. Thus, in addition to the characters "ABCDEFG . . . ", blackish displays of the patterns of "▲" and "●" can be visually observed. Since there is a reflection light from the cholesteric liquid crystal layer 302 which is above the print layer 305, a portion of the characters "ABCDEFG . . . " can be observed in the blackish displays of the patterns of "▲" and "●".

When the viewing angle is changed in the condition shown in FIG. 4A, color shift phenomenon occurs, and the color of the discrimination medium 310 shifts toward the color of shorter wavelengths. In this case, the portions "▲" and "●" are formed on the black print layer absorbing visible light, reflection light from the cholesteric liquid crystal layer 302 is relatively visible at these portions. Thus, the color shift phenomenon can be clearly observed.

When an optical filter, which allows a right-handed circularly polarized light to selectively pass therethrough and which blocks a left-handed circularly polarized light and a linearly polarized light, is disposed above the discrimination medium 310 (first substrate 301) in the condition shown in FIG. 4A, the condition shown in FIG. 4B is observed. In this case, by the function of the optical filter, only the right-handed circularly polarized light enters to the discrimination medium 310, a green component of the right-handed circularly polarized light entering thereto is reflected by the cholesteric liquid crystal layer 302, and another wavelength component of the right-handed circularly polarized light passes through the cholesteric liquid crystal layer 302. In this case, since the reflection light from the cholesteric liquid crystal layer 302 is mainly visually observed, the hologram display of characters "ABCDEFG . . . " becomes visible in the background having a green color at overall portions thereof. This appearance of the discrimination medium 310 is also obtained in a case in which the optical filter is disposed apart from the discrimination medium 310.

Next, when an optical filter, which allows a left-handed circularly polarized light to selectively pass therethrough and which blocks a right-handed circularly polarized light and a linearly polarized light, is disposed above the discrimination medium 310 (first substrate 301) in the condition shown in FIG. 4A, the condition shown in FIG. 4C is observed. In this case, by the function of the optical filter, only the left-handed circularly polarized light enters to the discrimination medium 310, the overall components of the right-handed circularly polarized light entering thereto pass through the cholesteric liquid crystal layer 302, and they are not reflected by the cholesteric liquid crystal layer 302. Thus, there is no reflection light from the cholesteric liquid crystal layer 302 (or the reflection light from the cholesteric liquid crystal layer 302 is very weak). The incident light arrives at the print layer 305, and the pattern of the print layer 305 can be preferentially observed. Thus, as shown in FIG. 4C, the black displays of the patterns "▲" and "●" can be observed in the whitish background which is caused by the surface of the article having the discrimination medium 310 affixed thereto. In this case, since there is no reflection light from the cholesteric liquid crystal layer 302 (or the reflection light from the cholesteric liquid crystal layer 302 is very weak), the displays of the patterns "▲" and "●" become more clearly black. This appearance is also obtained in a case in which the optical filter is disposed apart from the discrimination medium 310. Therefore, the authenticity of the discrimination medium 310 can be determined by using the difference between the appearances shown in FIGS. 4A to 4C.

Example 2 of Discrimination Function of Embodiment

Figure 5A:
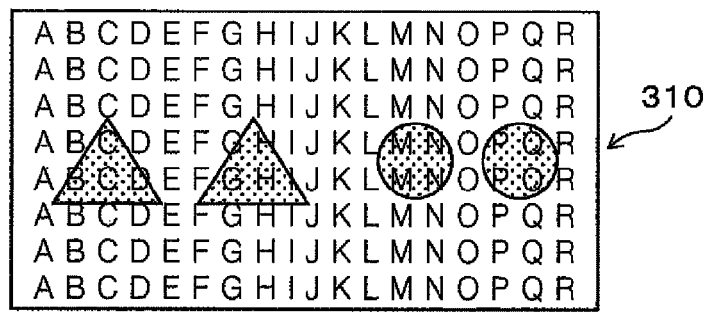
FIGS. 5A to 5C are diagrams showing one example of a discrimination function of a discrimination medium using one embodiment of the present invention.
Figure 5B:
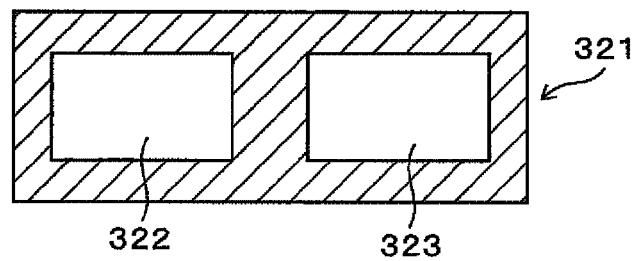
Figure 5C:
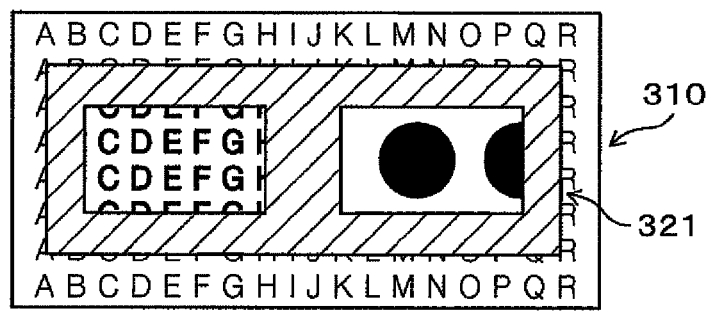

FIGS. 5A to 5C are conceptual diagrams showing an outline of a discrimination function of the discrimination medium 310 shown in FIG. 3E. An example will be explained in which the discrimination medium 310 which is the same as in the example shown in FIGS. 4A to 4C is observed by using a discrimination viewer. FIG. 5A shows a condition in which the discrimination medium 310 is observed from a side of the first substrate 301 by a direct visual check. In this case, the same condition shown in FIG. 4A is observed.

FIG. 5B shows a discrimination viewer 321. The discrimination viewer 321 is structured such that two rectangle opening portions 322 and 323 are formed at a plastic plate which blocks a visible light. The opening portion 322 of the discrimination viewer 321 has an optical filter. This optical filter fitted into the opening portion 322 allows a right-handed circularly polarized light to selectively pass therethrough and blocks a left-handed circularly polarized light and a linearly polarized light. The opening portion 323 of the discrimination viewer 321 has an optical filter. This optical filter fitted into the opening portion 323 allows a left-handed circularly polarized light to selectively pass therethrough and blocks a right-handed circularly polarized light and a linearly polarized light.

FIG. 5C shows a condition in which the discrimination viewer 321 is disposed above the first substrate 301 of the discrimination medium 310 (with reference to FIGS. 3A to 3E), and the discrimination medium 310 is observed via the discrimination viewer 321. In this case, since only the right-handed circularly polarized light passes through the opening portion 322, the hologram display (display of the characters "ABCDEFG . . . ") formed on the cholesteric liquid crystal layer 302 can be more clearly observed. On the other hand, since the right-handed circularly polarized light is blocked at the opening portion 323 and only the left-handed circularly polarized light passes through the opening portion 323, the hologram display (display of the characters "ABCDEFG . . . ") formed on the cholesteric liquid crystal layer 302 cannot be observed, and the patterns "▲" and "●" can be observed more clearly black. Therefore, the authenticity of the discrimination medium 310 can be determined by using the difference between the appearances obtained via the opening portions 322 and 323.

Preferableness of Embodiment

The pattern of the print layer 305 is added to the hologram display of the cholesteric liquid crystal layer, and complicated appearances of the discrimination medium can be thereby obtained, so that it is more difficult to counterfeit the discrimination medium. The displays for discrimination are obtained by combination of the hologram display formed on the cholesteric liquid crystal layer 302 and the figure of the print layer 305, so that the discrimination medium can have much information.

In the displays of the discrimination medium 310 shown in FIGS. 3E to 5C, since an expensive block may be used in order to realize the hologram display (display of the characters "ABCDEFG . . . " in the examples shown in FIGS. 4A to 4C and 5A to 5C) formed on the cholesteric liquid crystal layer 302, the modification of the display content may require a high cost. On the other hand, since the print layer 305 is formed by a typical print method, the cost for the modification may be relatively very low. That is, in the first embodiment, the modification of the pattern of the print layer 305 in the second substrate side member 32 can be performed at low cost. Therefore, the modification of displays of the patterns "▲" and "●" shown in FIGS. 4A to 4C and 5A to 5C can be performed at low cost. As a result, the discrimination medium can be redesigned at low cost. This effect is advantageous to manufacturing methods for a wide variety of products in small quantities.

When the discrimination medium 310, which is directly viewed, is tilted, the discrimination medium 310 exhibits the color shift phenomenon, so that an authenticity determination function using the color shift phenomenon can be obtained.

2. Second Embodiment

In the first embodiment, the print layer 305 is directly formed on the cholesteric liquid crystal layer 302, and the transparent second substrate 304 can be omitted. This example will be explained hereinafter. FIGS. 6A to 6E are cross sectional views showing another example of production processes for discrimination medium using the second embodiment of the present invention. In FIGS. 6A to 6E, explanation of portions denoted by the same reference numerals as those in FIGS. 3A to 3E is the same as the explanation using FIGS. 3A to 3E.

Figure 6A:
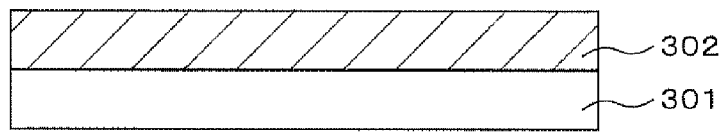
FIGS. 6A to 6E are diagrams showing another example of production processes for a discrimination medium using one embodiment of the present invention.
Figure 6B:
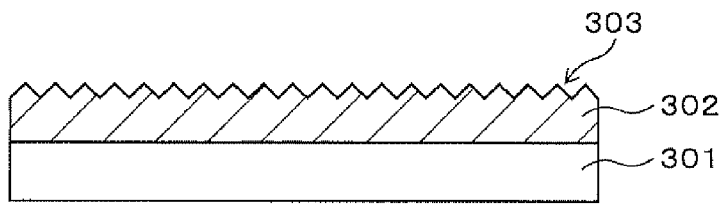
Figure 6C:
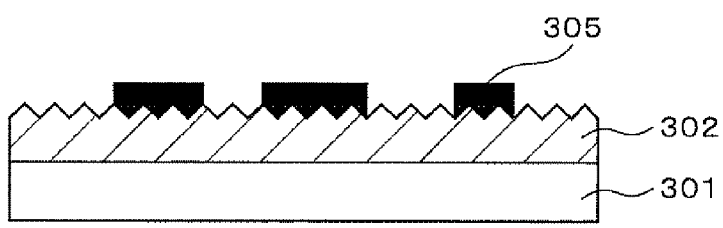
Figure 6D:
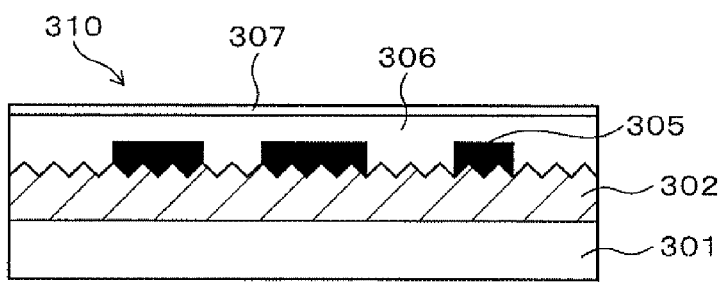

First, a cholesteric liquid crystal layer 302 is formed on a transparent first substrate 301 (in FIG. 6A). Next, a fine asperity 303 for hologram display is formed on the cholesteric liquid crystal layer 302 by using a block for forming a hologram (in FIG. 6B). Next, printing using a black ink is performed on the surface of the cholesteric liquid crystal layer 302, so that a print layer 305 having a predetermined pattern is formed (in FIG. 6C). Next, a transparent adhesive layer 306 covers the print layer 305 so as to be formed on the cholesteric liquid crystal layer 302. A release sheet 307 is affixed on the exposed surface of the adhesive layer 306. Thus, the discrimination medium 330 shown in FIG. 6D is obtained.

Figure 6E:
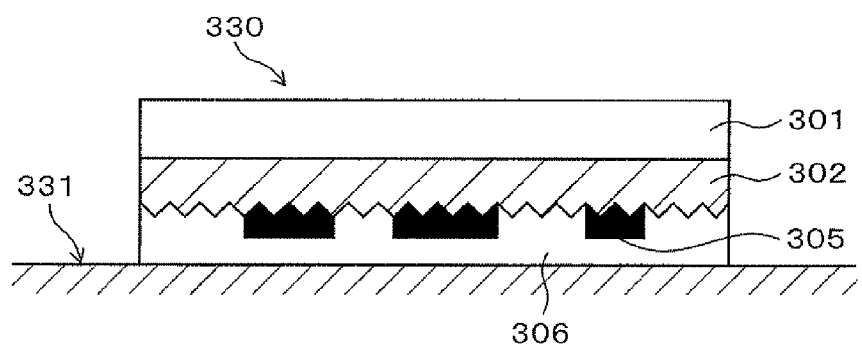

When the discrimination medium 330 is affixed on an article, as shown in FIG. 6E, the release sheet 307 is peeled, and the adhesive layer 306 is contacted on an article 331. The discrimination medium 330 can be secured on an article 331 by a function of the adhesive layer 306.

In this example, the discrimination medium 330 can be more thinned. Since setting of print conditions and the like is finer, a third person having no knowledge of detail production conditions cannot reproduce the discrimination medium 330, and counterfeiting of the discrimination medium 330 is more difficult. Since the production method for the discrimination medium 330 is more simplified than that for the case shown in FIGS. 3A to 3E, the production cost can be further reduced.

3. Third Embodiment

In the first embodiment and the second embodiment, the color of the print layer 305 is not limited to black which absorbing a visible light, and the color of the print layer 305 may be another color (red, blue, or the like) which selectively reflects light of predetermined wavelength. In this case, the display content for discrimination can be widely produced by combination of the print layer 305 and the cholesteric liquid crystal layer 302.

4. Another Embodiment

A gap may be formed to the discrimination medium 330 by cutting. In this case, when the discrimination medium 330 is peeled from the article, the discrimination medium 330 is torn at the gap and cannot be reused. Thus, illegal use of the discrimination medium can be prevented. By using this principle, an open discrimination sticker, which can indicate whether a package is broken or not, can be obtained.

A structure, which allows interlaminar fracture of discrimination medium 330 when the discrimination medium 330 is peeled from the article, can be formed to a portion of layers of the discrimination medium 330. For example, the interlaminar fracture position is adjusted such that before peeling occurs in the adhesive layer 306 or in the bond layer 308, a layer structure of the cholesteric liquid crystal layer 302 is physically broken and separation occurs in a layer direction thereof. This adjustment can be realized by adjustment of temperature conditions in production of the cholesteric liquid crystal layer 302.

INDUSTRIAL APPLICABILITY

The present invention can be applied to a discrimination medium used for determination of authenticity.

The invention claimed is:

1. A discrimination medium comprising:
a cholesteric liquid crystal layer which has a fine asperity used for displaying a hologram;
a print layer which has a predetermined pattern made of ink and which has a portion without the ink of the pattern around the pattern, wherein the portion without the ink of the pattern is transparent, the pattern reflecting or absorbing a light of a predetermined wavelength; and
a transparent adhesive layer,
wherein the cholesteric liquid crystal layer, the print layer, and the transparent adhesive layer, are disposed in turn from a side checked visually, the print layer is provided on a surface of the cholesteric liquid crystal layer on which the fine asperity is formed, the cholesteric liquid crystal layer is formed on a first substrate which is optically transparent, and the transparent adhesive layer is in contact with the print layer.

* * * * *